United States Patent Office 3,095,455
Patented June 25, 1963

3,095,455
PHOSPHINEDICHLOROMETHYLENES
Gino Joseph Marco, Webster Groves, and Angelo John Speziale, Kirkwood, Mo., assignors to Monsanto Chemical Company, St. Louis, Mo., a corporation of Delaware
No Drawing. Filed Nov. 29, 1961, Ser. No. 155,818
10 Claims. (Cl. 260—606.5)

This invention relates to a new and useful class of compounds and to the preparation of same.

The compounds of this invention are phosphinedichloromethylenes of the formula

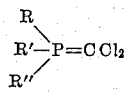

wherein R, R' and R" are like or unlike, contain from 1 to 12 carbon atoms and are either alkyl, or alkoxyalkyl or chloroalkyl radicals. Exemplary of R, R' and R" are methyl, ethyl, propyl, butyl, amyl, hexyl, octyl, decyl, dodecyl, and the various isomeric alkyl forms thereof, methoxyethyl, ethoxyethyl, propoxyethyl, amyloxyethyl, decyloxyethyl, ethoxyethoxyethyl, methoxypropyl, and the various isomeric alkoxyalkyl forms thereof containing up to twelve carbon atoms, chloromethyl, chloroethyl, chlorobutyl, dichlorobutyl, chlorohexyl, chlorodecyl, and the various isomeric chloroalkyl forms thereof containing up to twelve carbon atoms. In general it is preferred that the respective R, R' and R" groups be alkyl radicals containing 1 to 8 carbon atoms.

The phosphinedichloromethylenes of this invention are prepared by reacting trialiphatic phosphine of the formula

wherein R, R' and R" have the aforedescribed significance with dichlorocarbene (:CCl₂).

Dichlorocarbene is a well known material and methods for its preparation are well described in the literature. For example, it is prepared in an anhydrous system by (1) Replacing an alkali metal lower alkoxide with chloroform,
(2) Heating chloroform in the presence of phenyl lithium,
(3) Heating salts of trichloroacetic acid,
(4) Heating esters of trichloroacetic acid in the presence of alkali metal lower alkoxide.

Dichlorocarbene prepared by any of the known methods for its preparation is unstable but when prepared in the presence of trialiphatic phospines of the formula

wherein R, R' and R" have the aforedescribed significance, it reacts spontaneously to form the phosphinedichloromethylenes of this invention.

The trialiphatic phosphines useful in preparing the phosphinedichloromethylenes include trimethyl phosphine, triethyl phosphine, the various tripropyl phosphines, tributyl phosphines, triamyl phosphines, trihexyl phosphines, trioctyl phosphines, tridecyl phosphines, tridodecyl phosphines, tri(chloromethyl) phosphine, the various tri(chloropropyl) phosphines, tri(chlorobutyl) phosphines, tri(chlorohexyl) phosphines, tri(methoxyethyl) phosphine, tri(ethoxyethyl) phosphine, the various tri(propoxyethyl) phosphines, (dimethyl)(ethyl) phosphine, (diethyl)(methyl) phosphine, (diethyl)(propyl) phosphine, (diethyl)(isoamyl) phosphine, (dimethyl)(methoxyethyl) phosphine, (dimethyl)(chloromethyl) phosphine, and the like. The preferred trialiphatic phosphines are those of the foregoing structure wherein R, R' and R" are alkyl radicals containing 1 to 8 carbon atoms.

The abovedescribed dichlorocarbene reactant of the process of this invention is generated in situ, and reacts immediately with the trialiphatic phosphine to provide the phosphinedichloromethylenes of this invention. In that the phosphinedichloromethylenes are sensitive to water the process of this invention is preferably conducted in an anhydrous inert organic liquid media. Suitable liquid media include pentane, hexane, heptane, cyclohexane, benzene, toluene, xylene, and like inert liquid hydrocarbons, and also diethyl ether, diisopropyl ether, tetrahydrofuran, etc. While a wide range of reaction temperatures can be employed provided the system is fluid (i.e. a reaction temperature above the freezing point of the system up to and including the boiling point of the system) the optimum temperature will be that required to generate the dichlorocarbene. The preferred reaction temperature is that which produces a substantially quantitative yield of dichlorocarbene from the chlorine containing precursor therefor and which enables a rapid and substantially complete reaction of dichlorocarbene and trialiphatic phosphine.

To illustrate the preparation of the phosphinedichloromethylenes of this invention is the following:

Example I

To a suitable reaction vessel equipped with an agitator and thermometer is charged 20.2 grams of tri(n-butyl) phosphine, 12.0 grams of chloroform and 50 ml. of n-heptane. While agitating the mass is cooled to about −35° C. and while maintaining the agitating mass at −30° C. to −40° C. there is added over a 30 minute period 18.6 grams of an anhydrous equimolecular mixture of potassium t-butoxide and t-butanol and 300 ml. of n-heptane. A yellow suspension results, the yellow solid dispersed therein is identified as tri(n-butyl)phosphinedichloromethylene. Since this yellow solid is reactive with moisture it is preferably kept in suspension in the anhydrous inert organic liquid medium (n-heptane in this instance) and under a nitrogen atmosphere until used.

Upon adding 4,4'-dichlorobenzophenone in the form of a diethyl ether solution thereof to the yellow suspension of Example I in the cold (0–5° C.) and under a nitrogen atmosphere a suspension of tri(n-butyl) phosphine oxide and 1,1-di-(4-chlorophenyl)-2,2-dichloroethylene is obtained. Upon recovering 1,1-di-(4-chlorophenyl)-2,2-dichloroethylene from the suspension and hydrochlorinating same the well known insecticide DDT is obtained.

The yellow suspension of Example I is readily concentrated by azeotropically distilling off t-butanol (both added and by-product), the azeotrope in this instance being a mixture of t-butanol and n-heptane.

Example A

Employing the process of Example I but replacing chloroform with an equimolecular amount of bromoform failed to yield tri(n-butyl)phosphinedibromomethylene.

Example II

Employing the procedure of Example I but replacing tri(n-butyl) phosphine with an equimolecular amount of tri(2-ethyl-hexyl) phosphine there is obtained tri-(2-ethylhexyl)phosphinedichloromethylene.

Example III

Employing the procedure of Example I but replacing tri(n-butyl) phosphine with an equimolecular amount of tri(2-ethoxyethyl) phosphine there is obtained tri(2-ethoxyethyl)phosphinedichloromethylene.

Example IV

Employing the procedure of Example I but replacing tri(n-butyl) phosphine with an equimolecular amount of triethyl phosphine there is obtained triethylphosphinedichloromethylene.

Example V

Employing the procedure of Example I but replacing tri(n-butyl) phosphine with an equimolecular amount of triisopropyl phosphine there is obtained triisopropylphosphinedichloromethylene.

Example VI

Employing the procedure of Example I but replacing the anhydrous equimolecular mixture of potassium t-butoxide and t-butanol with 11.2 grams of anhydrous potassium t-butoxide tri(n-butyl) phosphinedichloromethylene is obtained in a comparable yield.

Example VII

Employing the procedure of Example I but replacing tri(n-butyl) phosphine with an equimolecular amount of tri(2-chloroethyl) phosphine there is obtained tri(2-chloroethyl)phosphinedichloromethylene.

Example VIII

Upon mixing equimolecular amounts of tri(n-butyl) phosphine and sodium a,a,a-trichloroacetate in benzene and refluxing the mixture tri(n-butyl)phosphinedichloromethylene is obtained.

Example IX

Employing the procedure of Example I but replacing potassium t-butoxide with an equimolecular amount of phenyl lithium and omitting t-butanol there is obtained tri(n-butyl)phosphinedichloromethylene.

Other phosphinedichloromethylenes of this invention obtained by the processes hereinbefore described include:

Trimethylphosphinedichloromethylene
Triisobutylphosphinedichloromethylene
Triisohexylphosphinedichloromethylene
Tri(n-dodecyl)phosphinedichloromethylene
Tri(2-isopropoxyethyl)phosphinedichloromethylene
Tri(4-chlorobutyl)phosphinedichloromethylene
Tri(2,3-dichloropropyl)phosphinedichloromethylene
(Methyl)(diethyl)phosphinedichloromethylene
(Ethyl)(di-n-butyl)phosphinedichloromethylene
(Diethyl)(4-chlorobutyl)phosphinedichloromethylene
(Diethyl)(2-ethoxyethyl)phosphinedichloromethylene The phosphinedichloromethylenes of this invention have toxic effects an various animal organisms and have utility as agricultural toxicants in the control of insects, nematodes and fungi. The new compounds have additional utility as intermediates in the preparation of known compounds described in the Journal of the American Chemical Society, vol. 48, p. 3144 (1926), for example any of the aforedescribed phosphinedichloromethylenes upon reacting with benzophenone provide 1,1-diphenyl-2,2-dichloroethylene. To illustrate such is the following:

Example B

To a suitable reaction vessel equipped with a thermometer and agitator is charged 20.2 grams of tri(n-butyl) phosphine, 12.0 grams of chloroform, and 50 ml. of n-heptane. The mass is cooled to about $-35°$ C. and while agitating 18.6 parts by weight of an anhydrous equimolecular mixture of potassium t-butoxide and t-butanol and 300 ml. of n-heptane is added over a 30 minute period. After the addition 18 parts by weight of benzophenone is added in the form of a diethyl ether solution thereof while maintaining the temperature at about $0°$ C. A nitrogen atmosphere is maintained in the reaction vessel at all times. After a 16 hour period the reaction mass is filtered and the filtrate is evaporated to dryness. The residue is dissolved in a benzene/hexane mixture from which tri(n-butyl) phosphine oxide precipitates. The mass is filtered and the filtrate is evaporated to dryness. The residue is 1,1-diphenyl-2,2-dichloro-ethylene which after recrystallizing from aqueous ethanol gave a melting point of $79$–$80°$ C.

This application is a continuation-in-part of copending application Serial No. 862,481, filed December 29, 1959, and now abandoned.

What is claimed is:

1. A phosphinedichloromethylene of the formula

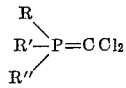

wherein R, R' and R'' respectively contain from 1 to 12 carbon atoms and are selected from the group consisting of alkyl, alkoxyalkyl and chloroalkyl.

2. A phosphinedichloromethylene of the formula

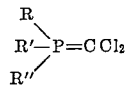

wherein R, R' and R'' are alkyl radicals containing 1 to 8 carbon atoms.

3. Tri(n-butyl)phosphinedichloromethylene
4. Triethylphosphinedichloromethylene
5. Triisopropylphosphinedichloromethylene
6. Tri(2-ethylhexyl)phosphinedichloromethylene
7. The method of making a phosphinedichloromethylene of claim 1 which comprises reacting phosphine of the formula

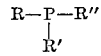

wherein R, R' and R'' respectively contain from 1 to 12 carbon atoms and are selected from the group consisting of alkyl, alkoxyalkyl and chloroalkyl, with dichlorocarbene generated in situ in an inert anhydrous organic liquid medium.

8. The method of making a phosphinedichloromethylene of the formula

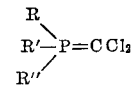

wherein R, R' and R'' are alkyl radicals containing 1 to 8 carbon atoms which comprises reacting phosphine of the formula

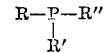

wherein R, R' and R'' have the abovedescribed significance with dichlorocarbene generated in situ in an inert anhydrous liquid organic medium.

9. The method of making a phosphinedichloromethylene of the formula

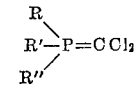

wherein R, R' and R'' are alkyl radicals containing 1 to 8 carbon atoms which comprises adding an alkali metal lower alkoxide to a mixture of chloroform and phosphine in an inert anhydrous liquid organic medium, said phosphine being of the structure

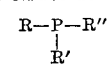

wherein R, R' and R'' have the abovedescribed significance.

10. The method of making tri-n-butylphosphinedichloromethylene which comprises adding potassium t-butoxide to a mixture of chloroform and tri(n-butyl)phosphine in an inert anhydrous liquid hydrocarbon.

No references cited.